US008483337B2

(12) United States Patent
Jones et al.

(10) Patent No.: US 8,483,337 B2
(45) Date of Patent: Jul. 9, 2013

(54) CANCELLING INTERFERENCE BY DETERMINING MODULATION AND CODING INFORMATION EMBEDDED IN A RECEIVED SPATIAL STREAM

(75) Inventors: Vincent Knowles Jones, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 13/173,714

(22) Filed: Jun. 30, 2011

(65) Prior Publication Data

US 2012/0294395 A1 Nov. 22, 2012

Related U.S. Application Data

(60) Provisional application No. 61/487,330, filed on May 18, 2011.

(51) Int. Cl.
*H03D 1/04* (2006.01)
*H03D 1/06* (2006.01)
*H04B 1/10* (2006.01)

(52) U.S. Cl.
USPC ............ 375/346; 375/260; 375/267; 375/350

(58) Field of Classification Search
USPC ........... 375/260, 267, 346–350; 370/203–211
See application file for complete search history.

(56) References Cited

U.S. PATENT DOCUMENTS

| 7,508,748 | B2 | 3/2009 | Kadous |
| 2010/0080323 | A1 | 4/2010 | Mueck et al. |
| 2010/0195594 | A1 | 8/2010 | Seo et al. |
| 2010/0303034 | A1* | 12/2010 | Chen et al. .................... 370/329 |
| 2011/0032875 | A1 | 2/2011 | Erceg et al. |
| 2011/0051705 | A1 | 3/2011 | Jones, IV et al. |
| 2011/0064043 | A1 | 3/2011 | Balachandran et al. |
| 2011/0249660 | A1* | 10/2011 | Noh et al. ...................... 370/338 |
| 2012/0182980 | A1* | 7/2012 | Abraham et al. ............. 370/338 |

FOREIGN PATENT DOCUMENTS

| EP | 2237460 A1 | 10/2010 |
| WO | 2010141911 A2 | 12/2010 |

OTHER PUBLICATIONS

International Search Report and Written Opinion—PCT/US2011/050086—ISA/EPO —Nov. 16, 2011.
Zhang H et al., "802.11ac Preamble", IEEE 802.11-10/0070R0, [Online] Jan. 18, 2010, pp. 1-11, XP002610760, Retrieved from the Internet: URL:https://mentor.ieee.org/802.11/dcn/10/11-10-0359-00-00ac-802-11ac-preambie.ppt> [retrieved on Nov. 22, 2010].

* cited by examiner

*Primary Examiner* — Curtis Odom
(74) *Attorney, Agent, or Firm* — Dang M. Vo

(57) ABSTRACT

Data-directed interference cancellation involves detecting the modulation and coding embedded in an interfering spatial stream and using the detected modulation and coding for interference cancellation in conjunction with decoding another spatial stream. In an 802.11ac-based system, the modulation and coding scheme of a spatial stream is specified by a SIGB value. Upon detecting the SIGB value of an interfering spatial stream in a received signal, the modulation and coding indicated by the SIGB value is used to identify the information transmitted in the interfering spatial stream. Once this information is known, the interference caused by the transmission of this information is canceled from the received signal to improve the decoding of the other spatial stream (or streams) in the received signal.

26 Claims, 9 Drawing Sheets

CANCELLING INTERFERENCE BY DETERMINING MODULATION AND CODING INFORMATION EMBEDDED IN A RECEIVED SPATIAL STREAM

CLAIM OF PRIORITY

This application claims the benefit of and priority to commonly owned U.S. Provisional Patent Application No. 61/487,330, filed May 18, 2011, the disclosure of which is hereby incorporated by reference herein.

BACKGROUND

1. Field

This application relates generally to wireless communication and more specifically, but not exclusively, to canceling interference from a received signal.

2. Introduction

A wireless multiple-in-multiple-out (MIMO) system simultaneously supports communication for multiple users (e.g., access terminals). An access point (e.g., a base station) of a MIMO system employs multiple antennas for data transmission and reception while each user employs one or more antennas. The access point communicates with the users via forward link channels and reverse link channels. A forward link (or downlink) channel refers to a communication channel from a transmit antenna of the access point to a receive antenna of a user, and a reverse link (or uplink) channel refers to a communication channel from a transmit antenna of a user to a receive antenna of the access point.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system provides improved performance (e.g., higher throughput and/or greater reliability) through the use of the additional dimensionalities provided by these spatial streams.

Under certain circumstances, a spatial stream directed to a given receive antenna causes interferences at another receive antenna due to, for example, the beamforming being less than ideal. One method of reducing this interference involves using multiple receive antennas at each user and employing interference-cancellation such as minimum mean square error (MMSE) spatial filtering. However, such an approach is undesirable in some cases (e.g., due to the need for multiple receive antennas). Consequently, there is a need for improved techniques for mitigating interference caused by spatial streams.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to mitigating interference at a receiver in a multi-user MIMO (MU-MIMO) environment. This interference arises, for example, when a user (e.g., an access terminal) receives a signal comprising multiple spatial streams where at least one of the spatial streams is directed to the user and at least one other one of the spatial streams is directed to at least one other user. In this case, the reception of the spatial stream(s) directed to the other user(s) may interfere with reception of the spatial stream(s) directed to the user. In accordance with the teachings herein, the user detects the code and modulation associated with each interfering spatial stream in the received signal, and uses the detected code and modulation for interference cancellation operations that attempt to eliminate this interference from the received signal. In this way, more accurate decoding of the spatial stream(s) directed to the user is achieved.

The disclosure relates in some aspects to an IEEE 802.11ac-based system where the modulation and coding scheme (MCS) for a given packet is specified by a SIGB value in the packet. In accordance with the teachings herein, a user detects the SIGB value of an interfering spatial stream by, for example, conducting a full maximum likelihood search, conducting a reduced maximum likelihood search, or using linear estimation. The user uses the modulation and coding indicated by the SIGB value to decode the information transmitted in the interfering spatial stream. Once the transmitted information and the modulation and coding are known, the user cancels (e.g., reduces, minimizes, etc.) interference caused by the transmission of this information from a spatial stream destined for the receiver by using successive interference cancellation or some other suitable technique.

BRIEF DESCRIPTION OF THE DRAWINGS

These and other sample aspects of the disclosure will be described in the detailed description and the appended claims that follow, and in the accompanying drawings, wherein:

Figure 1:
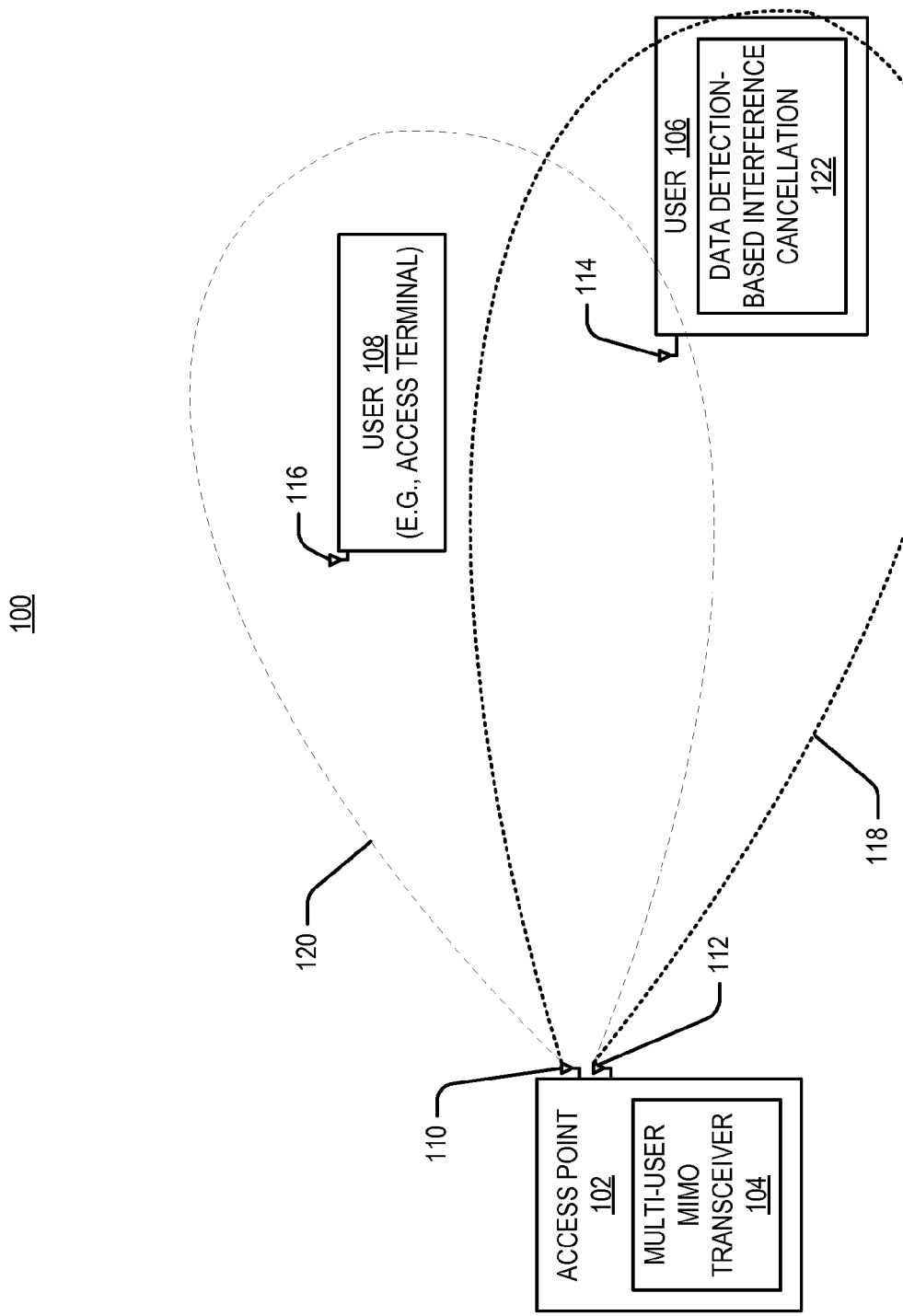
FIG. 1 is a simplified block diagram of several sample aspects of a communication system configured to perform data-directed interference cancellation.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of signal processing for an apparatus comprises: receiving a signal, processing the received signal to determine modulation and coding of at least one spatial stream directed to at least one other apparatus, and using the determined modulation and coding to cancel interference from the received signal, wherein the interference is due to the at least one spatial stream. In addition, in some aspects, the at least one spatial stream comprises 802.11ac packets that comprise at least one SIGB value, and the processing of the received signal comprises identifying the at least one SIGB value in the at least one spatial stream.

FIG. 1 illustrates sample aspects of a wireless local area network (WLAN) 100 where an access point 102 including a MU-MIMO transceiver 104 communicates with a user 106 and a user 108. The users 106 and 108 represent wireless communication devices (e.g., 802.11ac devices) that are referred to as access terminals, user equipment, user devices, clients, and so on in various implementations. In this simplified example, the access point 102 includes two transmit antennas 110 and 112, the user 106 includes one receive antenna 114, and the user 108 includes one receive antenna 116. It should be appreciated that the teachings herein are applicable to other implementations that include a different number of transmit antennas, a different number of receive antennas, a different number of users, and a different number of spatial streams.

The MU-MIMO transceiver 104 employs precoding (e.g., beamforming) for transmissions via the antennas 110 and 112 such that a spatial stream 118 (as represented in simplified for by a corresponding dashed line) is directed to the user 106 and a spatial stream 120 (again, represented by a corresponding dashed line) is directed to the user 108. Under certain circumstances (e.g., movement of the user 106 towards the user 108), the transmission of a spatial stream directed to one user will interfere with reception of another spatial stream at another user. FIG. 1 illustrates an example where the spatial stream 120 interferes with reception of the spatial stream 118 at the user 106. In accordance with the teachings herein, the user 106 (and any other user in the system 100) incorporates data detection-based interference cancellation 122 to cancel interference caused by one or more spatial streams directed to one or more other users. As discussed in more detail below, in some aspects, data detection-based interference cancellation as taught herein involves using resolvable long training sequences and non-linear decoding to determine the MCS for every interfering spatial stream, followed by non-linear decoding or successive interference cancellation.

Figure 2:
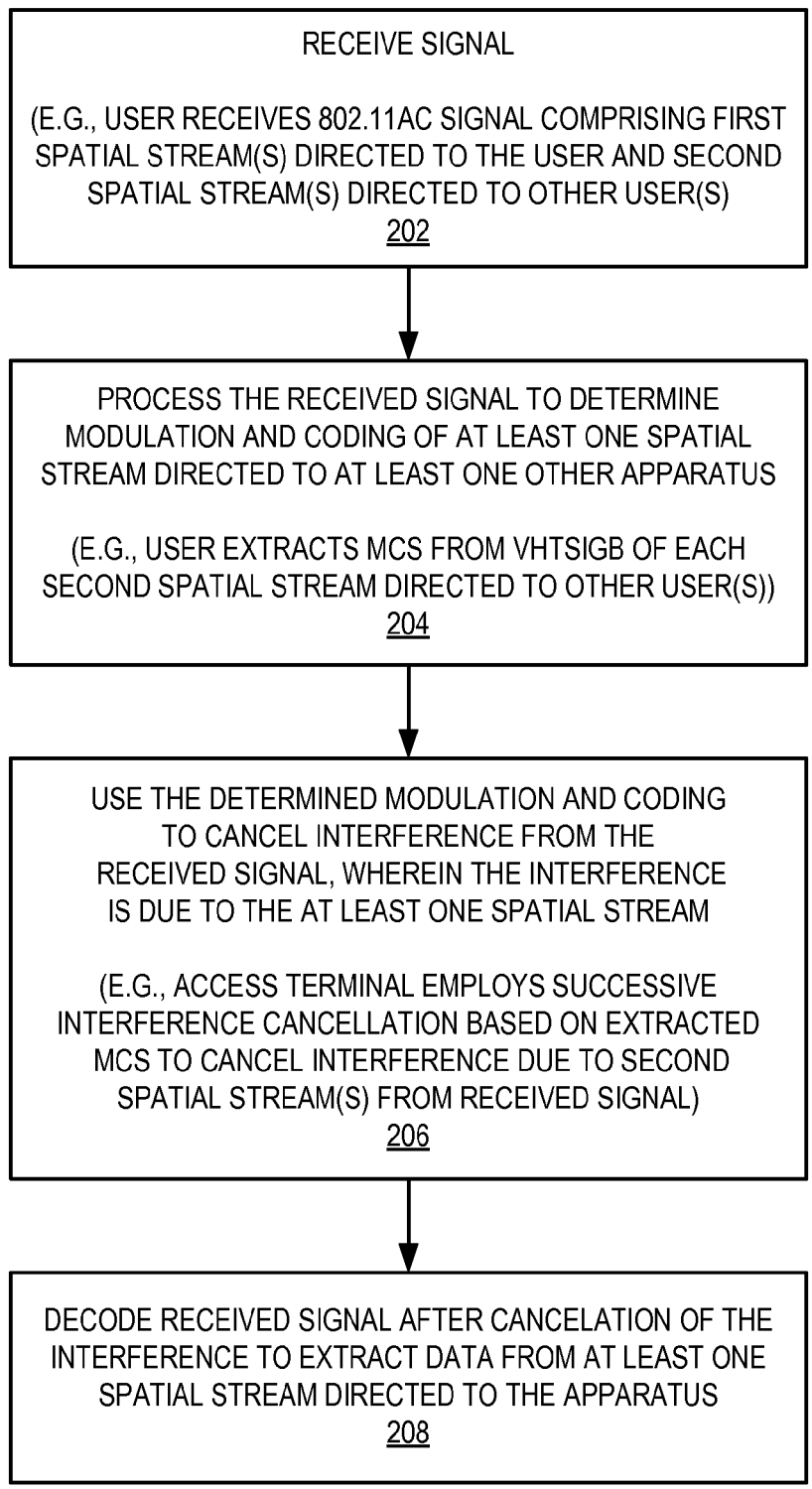
FIG. 2 is a flowchart of several sample aspects of operations performed in conjunction with mitigating interference caused by a received spatial stream.

FIG. 2 illustrates an example of interference cancellation operations in accordance with the teachings herein. For purposes of illustration, the operations of FIG. 2 (or any other operations discussed or taught herein) may be described as being performed by specific components. For example, the operations of FIG. 2 are described from the perspective of a first apparatus such as an access terminal that expects to receive one or more spatial streams from an associated apparatus such as an access point. These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

As represented by block 202 of FIG. 2, at some point in time, a first apparatus receives a signal. For example, in an 802.11 ac implementation, the first apparatus receives a signal from an associated 802.11ac access point that employs MU-MIMO and concurrently transmits spatial streams to multiple apparatuses (e.g., user access terminals). Consequently, this signal includes at least one spatial stream directed to the first apparatus and also includes at least one spatial stream directed to at least one other apparatus. Thus, from the perspective of the first apparatus, a spatial stream directed to another apparatus is an interfering spatial stream.

As represented by block 204, the received signal is processed to determine modulation and coding of at least one spatial stream directed to at least one other apparatus (e.g., at least one other user access terminal). For example, information from a signal field of the spatial stream is extracted in some implementations. Continuing with the above 802.11ac example, each spatial stream comprises 802.11ac packets each of which, in turn, comprises a preamble including a SIGB field.

Figure 3:
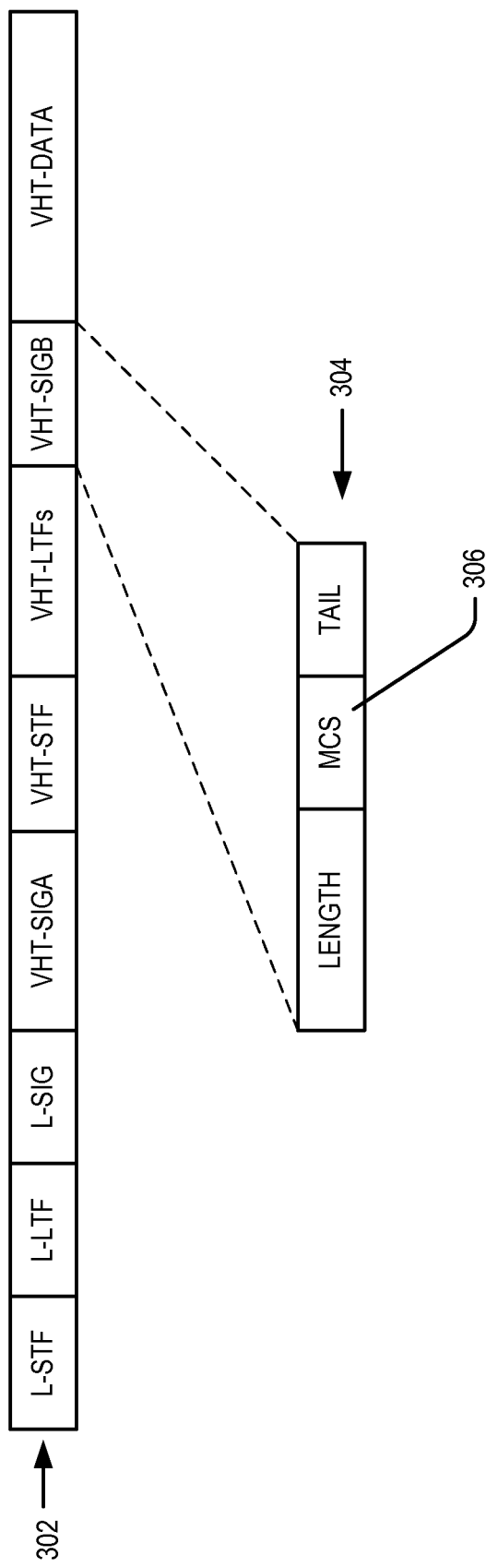
FIG. 3 is a diagram of an IEEE 802.11 ac preamble.

FIG. 3 illustrates an example of an 802.11 ac preamble 302. The VHT-SIGB field 304 is broken out to illustrate that this field include a modulation and coding scheme (MCS) field 306. The MCS field 306 comprises 4 bits that identify a modulation and coding scheme specified by the 802.11 ac standard such as, for example, QPSK rate ½ and 64 QAM rate ¾. It should be appreciated that different formats for a packet preamble, a signal field, and an MCS field may be used in different implementations.

Referring again to block 204 of FIG. 2, in the 802.11ac example, the first apparatus processes the received signal to identify the SIGB value in each interfering spatial stream. As discussed in more detail below, this is accomplished in different ways in different implementations.

In some implementations, the identification of a SIGB value in a given spatial stream comprises conducting a linear maximum likelihood (ML) search for the SIGB value in that spatial stream. An example of such a search is described in more detail below in conjunction with FIG. 5.

Some implementations employ a reduced ML search to identify SIGB values. For example, in the event the received signal comprises a plurality of spatial streams (e.g., directed to a plurality of access terminals), the identification of SIGB values may involve identifying a set of strongest spatial streams from the plurality of spatial streams, and conducting an ML search for SIGB values only on the set of strongest spatial streams.

Some implementations employ linear estimation to identify SIGB values. For example, in the event the received signal comprises a plurality of spatial streams (e.g., directed to a plurality of access terminals), the identification of SIGB values may involve identifying a set of strongest spatial streams from the plurality of spatial streams, and conducting linear estimation operations on the set of strongest spatial streams to determine the SIGB values only for those spatial streams.

Upon identification of the SIGB value of a given spatial stream, the modulation and coding scheme for that spatial stream is extracted from the SIGB value. As discussed above, some spatial streams employ QPSK rate ½, some spatial streams employ 64 QAM rate ¾, and so on.

In some implementations, the processing of the received signal at block 204 also involves verifying the accuracy of each identified SIGB value. For example, upon identifying a SIGB value in a given spatial stream, the SIGB value is processed to determine whether the SIGB value is valid. In this case, the modulation and coding scheme is extracted from the SIGB value if the SIGB value is determined to be valid. In some implementations, this processing of a SIGB value comprises performing a cyclic redundancy check (CRC) operation on the SIGB value.

As represented by block 206, the modulation and coding determined at block 204 is used to cancel interference from the received signal. As discussed above, this interference is due to the spatial stream(s) directed to the other apparatus(es). A multi-user detection scheme such as successive interference cancellation or maximum likelihood MIMO (ML-MIMO) decoding may be used here to reduce the negative effects of interfering spatial streams. An example of successive interference cancellation is described below in conjunction with FIG. 6.

In some cases, the operations of block 206 involve determining how many interfering spatial streams are significant enough to warrant cancellation. For example, a threshold (e.g., indicative of signal strength) may be applied to each interfering spatial stream to determine whether to cancel interference from that spatial stream. In such a case, interference may only be canceled for the strongest interferers. Also, in the event multiple spatial streams are directed to the first apparatus, the first apparatus will cancel the interference from each of these spatial streams. For example, the first apparatus will perform interference cancellation as taught herein on a first signal received at a first antenna, on a second signal received at a second antenna, and so on.

As represented by block 208, the first apparatus decodes the received signal after the cancellation of the interference to extract the data from each spatial stream directed to the first apparatus. Consequently, high quality decoding may be achieved at the first apparatus since any significant interference from the interfering spatial streams will be removed from the signal prior to the decoding.

With the above in mind, a detailed example of data-directed interference cancellation will be described with reference to FIGS. 4-6. For purposes of illustration, this example is described in the context of an access terminal that receives a signal comprising multiple 802.11 ac spatial streams from an associated access point. At least one of these spatial streams is directed to the access terminal and at least one other spatial stream is directed to at least one another access terminal.

Figure 4:
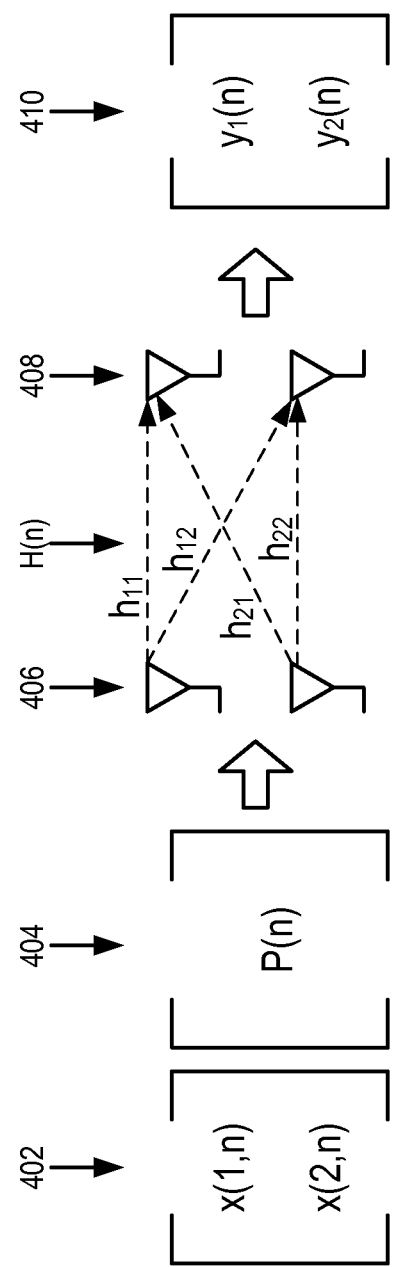
FIG. 4 is a simplified diagram of sample MU-MIMO transmissions.

FIG. 4 illustrates a simplified example of signal transmission from the access point for the case where there are two access terminals. Here, as in the example of FIG. 1, two transmit antennas are used to send information to the two access terminals, each of which has a single receive antenna. As represented by the matrix 402, the access point generates an output signal x(1,n) destined for the first access terminal and generates an output signal x(2,n) destined for the second access terminal. The parameter n represents that the signals are sent over n tones using orthogonal frequency-division multiplexing (OFDM). The output signals are applied to a precoding matrix 404 (e.g., with elements $P_{11}$, $P_{12}$, $P_{21}$, and $P_{22}$ for a 2×2 matrix. The result of this operation is transmitted via two antennas 406. The resulting signals are transmitted via a channel matrix H(n) to the receive antennas 408, where the channels associated with the different transmit antenna-receive antenna pairs are represented by $h_{11}$, $h_{12}$, $h_{21}$, and $h_{22}$ as shown. The received signals are represented by a matrix 410 where, as stated above, one receive antenna is associated with each access terminal. Here, the signal $y_1(n)$ is the signal received at one access terminal and the signal $y_2(n)$ is the signal received at the other access terminal. The parameters illustrated in FIG. 4 will be referred to in the discussion of FIG. 5 that follows.

Figure 5:
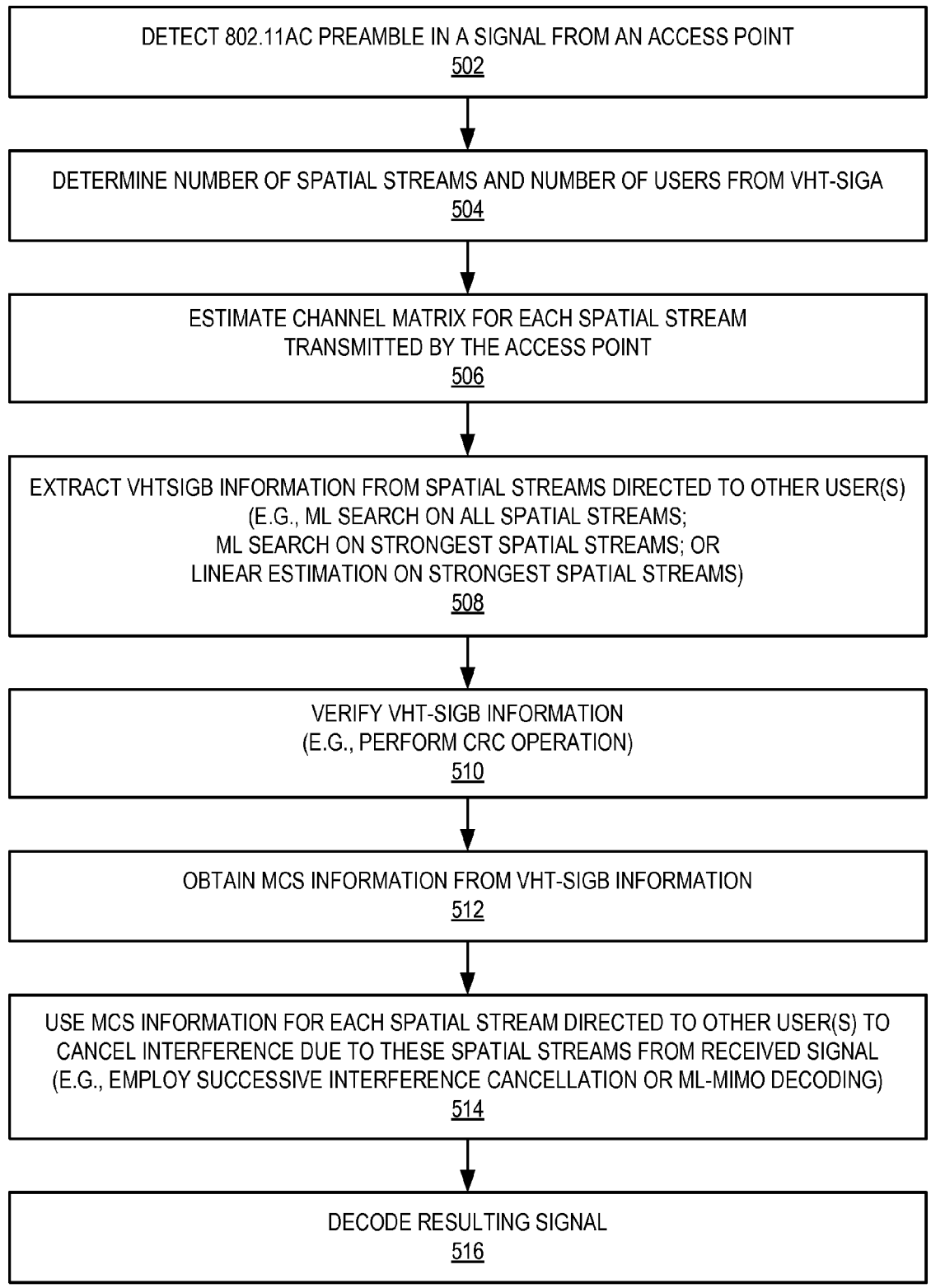
FIG. 5 is a flowchart of several sample aspects of operations performed in conjunction with extracting modulation and coding information from a received spatial stream.

FIG. 5 illustrates an example of data-directed interference cancellation operations. These operations are described in the context of an 802.11ac spatial-division multiple access (SDMA) transmission from an access point to several access terminals. In 802.11ac, an entity that communicates with an access point is typically referred to as a user (or client) and for purposes of consistency that terminology is used in the description that follows. For purposes of illustration, however, the operations of FIG. 5 are also described as being performed by an access terminal (i.e., corresponding to the user). It should be appreciated that in various implementations a given user (access terminal) will have one or more receive antennas and corresponding receive chains. Thus, a given user (access terminal) will receive one or more spatial streams, depending on the particular implementation.

As shown in FIG. 3, the 802.11 ac preamble includes three legacy fields (L-STF, L-LTF, and L-SIG) and five VHT (very high throughput) fields. The VHT fields are of primary concern here.

The VHT-SIGA field is the first VHT signal field in the packet. This field carries information about the packet structure that all users (access terminals) need to know to receive the VHT information in the packet. For example, this information indicates whether the transmission is for a single user or multiple users and identifies how spatial streams are organized for each user. The SIGA field is not precoded and, hence, is readily readable by all users.

The VHT short training field (VHT-STF) and VHT long training fields (VHT-LTFs) are precoded fields. Thus, the training fields intended for a given user will generally have stronger signal strength at that user than the other training fields intended for other users. The VHT long training fields (VHT-LTFs) provide a signal to enable each user to do channel estimation.

The VHT-SIGB field is the second VHT signal field in the packet. This field carries per-user information including the data rate for that particular user as specified by the MCS information. The SIGB field is precoded and, hence, is not readily readable by other users.

The VHT-Data field carries per-user data. This field is also precoded.

Referring to the operations of FIG. 5, as represented by block 502, an access terminal detects an 802.11 ac preamble in a signal received from an access point. The access terminal identifies an 802.11ac packet by auto-detecting the rotation of binary phase shift keying (BPSK) on the second OFDM symbol of the VHT-SIGA field.

As represented by block 504, the access terminal uses the SIGA information to determine information about the spatial streams. In particular, the access terminal determines the total number of spatial streams involved in the transmission, the number of users being served, and the number of spatial streams assigned to each user.

As represented by block 506, the access terminal generates an estimate of a channel matrix corresponding to each spatial stream transmitted by the access point. In other words, the channel matrix includes elements corresponding to each channel from a given access point antenna to a given receive antenna. As there is one channel matrix for every OFDM tone n, the channel matrix is designated by H(n). In the simplified example of FIG. 4, the channel matrix H(n) is a 2×2 matrix since there are two access point antennas and two access terminal antennas. The size of the channel matrix H(n) increases accordingly for implementations where there are more access point antennas and/or access terminal antennas.

As represented by block 508, the access terminal extracts the SIGB information from at least one spatial stream directed to at least one other user (e.g., at least one other access terminal). As mentioned above at block 204, this information is extracted in different ways in different implementations. An example of: 1) an ML search; 2) a reduced ML search; and 3) a linear estimation, conducted on a given interfering spatial stream follows. In a case where there are multiple interfering streams to be cancelled from the received signal, the SIGB extraction operation is conducted for each interfering stream.

One example of a linear ML search involves searching through all possible SIGBs values that could have been transmitted with the spatial stream. There is one unique SIGB per user. In one 802.11ac implementation of the SIGB field, there are 26 bits in the field. In this implementation, the SIGB field includes a length field of 16 bits, an MCS field of 4 bits, and a tail field of 6 bits. Hence, there could be up to $2^{26}$ searches in this case. In practice, the size of this search is typically smaller since the tail field is generally a known quantity (e.g., 6 zeros) and in some cases certain information is known about the contents of the length field.

In a sample implementation, an ML search involves identifying the SIGB value that provides the smallest squared difference with respect to the received signal. Equation 1 illustrates an example of this operation. The received signal is y(n), where y is a vector with elements that represent the receive antennas. The input signal x(i,n) is a possible transmitted signal of SIGB with elements equal to the number of unique SIGB values sent (or spatial streams). That is, the variable i represents a given instance of one of the possible bit patterns for SIGB. FIG. 4 illustrates an example of these quantities for a simple implementation that has two transmit antennas and two receive antennas.

$$d(i) = \sum_n |y(n) - H(n)x(i, n)|^2 \qquad \text{EQUATION 1}$$

The ML search of Equation 1 thus involves generating the parameter d(i) for every possible value x(i,n), given a particular received signal y(n) over all tones n. The value for x(i,n) that provides the minimum value for d(i) is then identified as the detected SIGB value.

A reduced ML search may be employed in a situation where multiple interfering spatial streams are received at an access point. Here, sufficient interference cancellation is achieved in some cases by only cancelling a portion of the interfering spatial streams from the received signal. Accordingly, an ML search is only conducted on each of the strongest interfering spatial streams here.

A variety of techniques may be used to identify the strongest interfering spatial streams. In some implementations, the strongest interfering spatial streams are identified based on received signal strengths of the spatial streams (e.g., corresponding to the signal strengths of the SIGBs at the access terminal). In some implementations, the signal strengths are determined using relevant columns of the H(n) matrix. Here, metrics such as $\text{norm}(H(n))^2$ and post-processing signal-to-interference-and-noise ratio (SINR) are employed in some cases.

Linear estimation also may be used to estimate the SIGB value embedded in an interfering spatial stream. This involves, in a typical implementation, configuring a receive chain to acquire a given interfering spatial stream and using linear filtering to generate an estimate of the received signal. Assuming this technique provides an accurate result, this resulting estimate will include the SIGB value that is imbedded in the spatial stream.

Linear estimation techniques may be employed in a situation where multiple interfering spatial streams are received at an access point. In this case, linear estimation is performed on the strongest interfering spatial streams to identify the SIGB values of those spatial streams. The strongest interfering spatial streams are determined in the manner discussed above or in some other suitable manner.

As represented by block 510 of FIG. 5, in some implementations the access terminal verifies the accuracy of the SIGB value(s) obtained at block 508. For example, 8 bits of CRC information for the SIGB value is included in the VHT-Data field. Thus, in some implementations the access terminal employs a CRC operation (e.g., using a Viterbi decoder) to verify that the SIGB value corresponds to the associated CRC information. In other words, the CRC operation determines whether the SIGB value was decoded correctly.

This CRC operation may be used to determine whether a given spatial stream is deemed to be an "interfering" spatial stream. For example, if the CRC of a SIGB value passes, it is deemed that the associated spatial stream (intended for another access terminal) does interfere with the reception of a desired spatial stream at the access terminal. Conversely, if the SIGB value was not decoded correctly (i.e., the CRC failed), it is deemed that the spatial stream associated with that SIGB value is not strong enough to be decoded and, hence, does not significantly interfere with the reception of a desired spatial stream.

Other techniques may be employed to determine whether a given spatial stream is an "interfering" spatial stream. For example, in some implementations, only those spatial streams that have a signal-to-noise ratio (SNR), as seen by the access terminal, that is greater than or equal to a threshold are deemed to be "interfering" spatial streams. In some implementations, this threshold is based on (e.g., set equal to or equal to plus a margin) the SNR, as seen by the access terminal, of a spatial stream that is directed to the access terminal.

As represented by block 512, in the event a valid SIGB value is obtained at block 508, the access terminal obtains the MCS information from the SIGB value. At this point in the process, the access terminal is able to identify each interfering spatial stream along with the MCS of each of these spatial streams.

Thus, as represented by block 514, the access terminal uses the MCS information of each interfering spatial stream to cancel interference due to each of these spatial streams from the received signal. As mentioned above at block 206, a multi-user detection scheme such as successive interference cancellation (SIC) or ML-MIMO decoding may be used for this purpose. The result of this operation is the received signal minus any signal components that were cancelled.

As represented by block 516, the access terminal decodes the signal that results from the operations of block 514 to obtain the data from each VHT-Data field that is directed to that access terminal. Here, the access terminal is able to determine each spatial stream that is directed to that access terminal since the access terminal is configured by the access point with the MCS of each of these streams.

Figure 6:
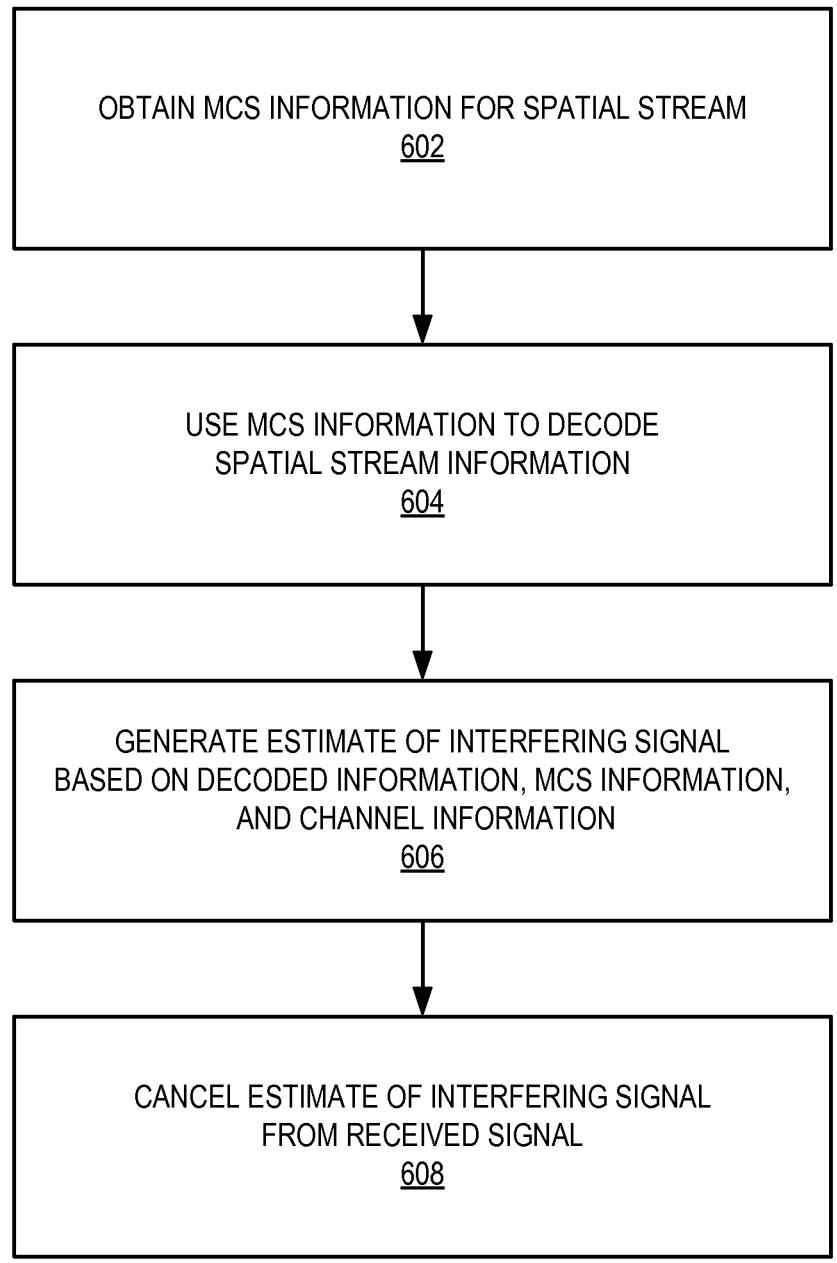
FIG. 6 is a flowchart of several sample aspects of successive interference cancellation operations that employ modulation and coding information extracted from a received spatial stream.

FIG. 6 illustrates sample successive interference cancellation operations that may be employed to eliminate signal components of an interfering stream from a received signal. For purposes of illustration, these operations are described in the context of cancelling one interfering spatial stream from a received signal. It should be understood that these techniques are applicable to the case where interference from multiple spatial streams is to be cancelled from a received signal.

As represented by block 602, the MCS information for a spatial stream is obtained. This operation corresponds, for example, to blocks 502-512 of FIG. 5.

As represented by block 604, the MCS information is used to decode any precoded information in the spatial stream. For example, the training fields and the VHT-Data fields are decoded at this point in a typical implementation.

As represented by block 606, an estimate of the interfering signal (i.e., the spatial stream) as it appears at the receive chain of the access terminal is generated. This estimate takes into account the information transmitted by the access point (directed to another access terminal), the modulation and coding used on the information at the access point, and the channel though which the modulated and coded information travels from the transmit chain of the access point to the receive chain of the access terminal.

As represented by block 608, the estimate of the interfering signal generated at block 606 is cancelled from the received signal. The resulting signal thus corresponds to the signal provided by block 514 of FIG. 5 that is then decoded to obtain the data directed to the access terminal.

Figure 7:
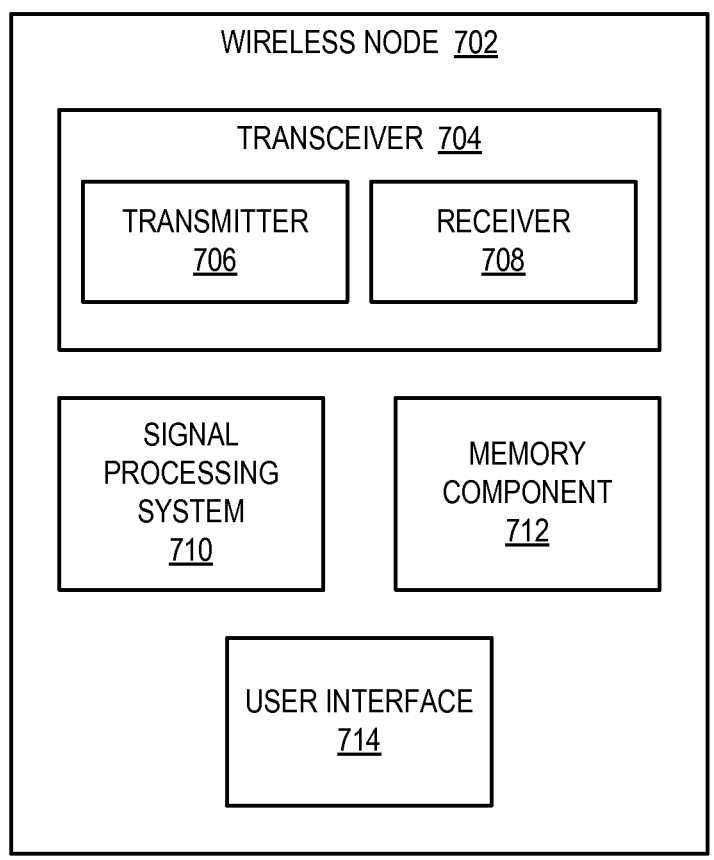
FIG. 7 is a simplified block diagram of several sample aspects of components that may be employed in communication nodes.

FIG. 7 illustrates several sample components (represented by corresponding blocks) that are incorporated into a wireless node 702 to perform interference cancellation-related operations as taught herein. In a typical implementation, the wireless node 702 is an access terminal (e.g., corresponding to the user 106 of FIG. 1). The wireless node 702 may comprise another type of device that receives interference from spatial streams in other implementations (e.g., an access point that receives interference from non-associated access terminals). Accordingly, the components described in FIG. 7 may be incorporated into other nodes in a communication system. Also, a given node may contain one or more of the described components. For example, a wireless node may contain multiple transceiver components that enable the wireless node to operate on multiple carriers and/or communicate via different technologies.

As shown in FIG. 7, the wireless node 702 includes one or more transceivers (as represented by a transceiver 704) for communicating with other nodes. Each transceiver 704 includes a transmitter 706 for sending signals (e.g., comprising spatial streams) and a receiver 708 for receiving signals (e.g., comprising spatial streams).

The wireless node 702 also includes other components that are used in conjunction with interference cancellation-related operations as taught herein. For example, the wireless node 702 includes a signal processing system 710 for processing received signals and/or signals to be transmitted (e.g., processing a received signal to determine modulation and coding of at least one spatial stream directed to at least one other apparatus (e.g., at least one other wireless node), using the determined modulation and coding to cancel interference from the received signal, decoding a received signal after the cancellation of interference to extract data from another spatial stream directed to the wireless node) and for providing other related functionality as taught herein. In some implementations, operations of the signal processing system 710 are implemented in the transceiver 704. The wireless node 702 includes a memory component 712 (e.g., including a memory device) for maintaining information (e.g., acquired SIGB information). The wireless node 702 also includes a user interface 714 for providing indications (e.g., audible and/or visual indications) to a user and/or for receiving user input (e.g., upon user actuation of a sensing device such a microphone, a camera, a keypad, and so on).

The components of FIG. 7 may be implemented in various ways. In some implementations the components of FIG. 7 are implemented in one or more circuits such as, for example, one or more processing systems and/or one or more ASICs (which may include one or more processing systems). Here, each circuit (e.g., processing system) may use and/or incorporate memory for storing information or executable code used by the circuit to provide this functionality. For example, some of the functionality represented by block 704 and some or all of the functionality represented by blocks 710-714 may be implemented by a processing system of a wireless node and memory of the wireless node (e.g., by execution of appropriate code and/or by appropriate configuration of processing system components).

Figure 8:
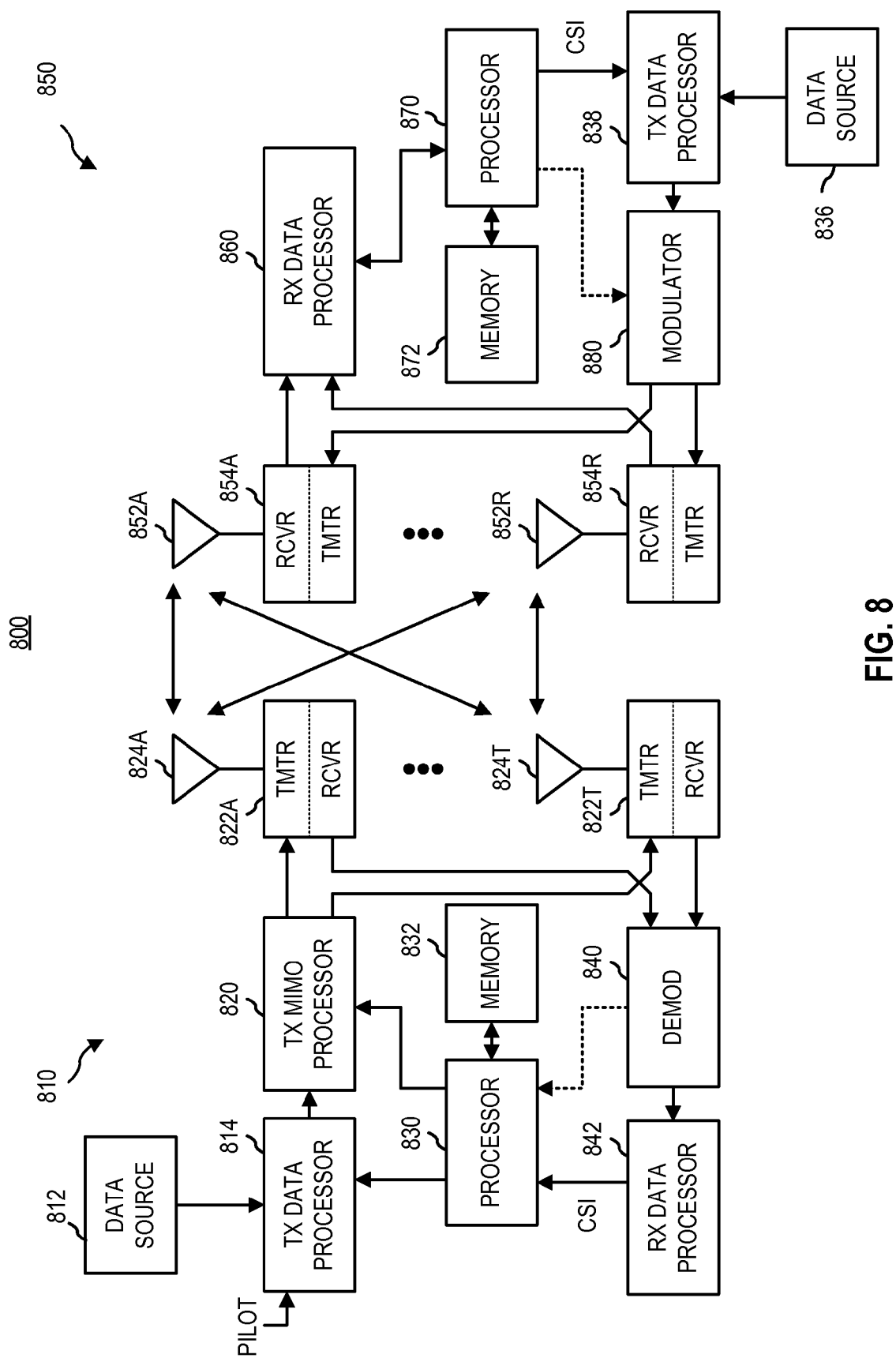
FIG. 8 is a simplified block diagram of several sample aspects of communication components.

FIG. 8 illustrates in more detail sample components that may be employed in a pair of wireless nodes of a MIMO system 800. In this example, the wireless nodes are labeled as a wireless device 810 (e.g., an access point) and a wireless device 850 (e.g., an access terminal). It should be appreciated that a MU-MIMO system will include other devices (e.g., access terminals) similar to the wireless device 850. To reduce the complexity of FIG. 8, however, only one such device is shown.

The MIMO system 800 employs multiple ($N_T$) transmit antennas and multiple ($N_R$) receive antennas for data transmission. A MIMO channel formed by the $N_T$ transmit and $N_R$ receive antennas is decomposed into $N_s$ independent channels, which are also referred to as spatial channels, where $N_S \leq \min\{N_T, N_R\}$.

The MIMO system 800 supports time division duplex (TDD) and/or frequency division duplex (FDD). In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 810, traffic data for a number of data streams is provided from a data source 812 to a transmit (TX) data processor 814. Each data stream is then transmitted over a respective transmit antenna.

The TX data processor 814 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 830. A memory 832 stores program code, data, and other information used by the processor 830 or other components of the device 810.

The modulation symbols for all data streams are then provided to a TX MIMO processor 820, which further processes the modulation symbols (e.g., for OFDM). The TX MIMO processor 820 then provides $N_T$ modulation symbol streams to $N_T$ transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which precoding matrix to use (discussed below). The processor 870 formulates a reverse link message comprising a matrix index portion and a rank value portion. A memory 872 stores program code, data, and other information used by the processor 870 or other components of the device 850.

The reverse link message comprises various types of information regarding the communication link and/or the received data stream. The reverse link message is processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which precoding matrix to use for determining the beamforming weights by processing the extracted message.

In some implementations, the receive data processor 860 and/or the processor 870 performs the interference cancellation operations described herein. It should be appreciated that these operations may be performed in cooperation with other components of FIG. 8 and/or by other components of FIG. 8 in some implementations.

A wireless node may include various components that perform functions based on signals that are transmitted by or received at the wireless node. For example, in some implementations a wireless node comprises a user interface configured to output an indication based on a received signal after cancellation of interference as taught herein.

A wireless node as taught herein may communicate via one or more wireless communication links that are based on or otherwise support any suitable wireless communication technology. For example, in some aspects a wireless node may associate with a network such as a local area network (e.g., a Wi-Fi network) or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), an entertainment device (e.g., a music or video device), a headset (e.g., headphones, an earpiece, etc.), a microphone, a medical sensing device (e.g., a sensor such as a biometric sensor, a heart rate monitor, a pedometer, an EKG device, a smart bandage, a vital signal monitor, etc.), a user I/O device (e.g., a watch, a remote control, a switch such as a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, a gaming device, or any other suitable device. The communication devices described herein may be used in any type of sensing application, such as for sensing automotive, athletic, and physiological (medical) responses. Any of the disclosed aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as a station, a user, a client, user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a WLAN access point, a WLAN base station, a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a wireless node comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Figure 9:
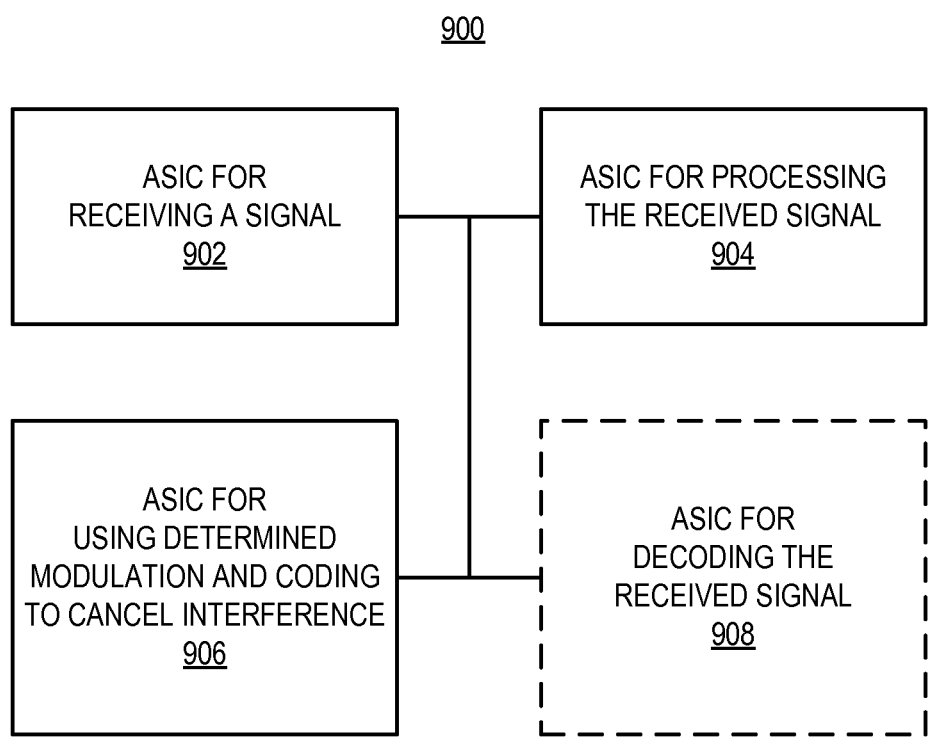
FIG. 9 is a simplified block diagram of several sample aspects of an apparatus configured to provide interference cancellation as taught herein.

The components described herein may be implemented in a variety of ways. Referring to FIG. 9, an apparatus 900 is represented as a series of interrelated functional blocks that represent functions implemented by, for example, one or more integrated circuits (e.g., an ASIC) or implemented in some other manner as taught herein. As discussed herein, an integrated circuit may include a processing system, software, other components, or some combination thereof.

The apparatus 900 includes one or more modules that perform one or more of the functions described above with regard to various figures. For example, an ASIC for receiving a signal 902 corresponds to, for example, a receiver (e.g., an RF receive chain) and/or a processing system as discussed herein. An ASIC for processing the received signal 904 corresponds to, for example, a processing system and/or a receiver as discussed herein. An ASIC for using determined modulation and coding to cancel interference 906 corresponds to, for example, a processing system and/or a receiver as discussed herein. An ASIC for decoding the received signal 908 corresponds to, for example, a processing system and/or a receiver as discussed herein.

As noted above, in some aspects these components may be implemented via appropriate processing system components. These processing system components may in some aspects be implemented, at least in part, using structure as taught herein. In some aspects a processing system may be configured to implement a portion or all of the functionality of one or more of these components. In some aspects, one or more of any components represented by dashed boxes are optional.

As noted above, the apparatus 900 comprises one or more integrated circuits in some implementations. For example, in some aspects a single integrated circuit implements the functionality of one or more of the illustrated components, while in other aspects more than one integrated circuit implements the functionality of one or more of the illustrated components.

In addition, the components and functions represented by FIG. 9 as well as other components and functions described herein, may be implemented using any suitable means. Such means are implemented, at least in part, using corresponding structure as taught herein. For example, the components described above in conjunction with the "ASIC for" components of FIG. 9 correspond to similarly designated "means for" functionality. Thus, one or more of such means is implemented using one or more of processing system components, integrated circuits, or other suitable structure as taught herein in some implementations.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of signal processing for an apparatus, comprising:
   receiving a signal;
   processing the received signal to determine modulation and coding of at least one spatial stream directed to at least one other apparatus; and
   using the determined modulation and coding to cancel interference from the received signal, wherein the interference is due to the at least one spatial stream, wherein:
   the at least one spatial stream comprises packets that comprise at least one value that specifies a modulation and coding scheme of the at least one spatial stream;
   the processing of the received signal comprises identifying the at least one value in the at least one spatial stream; and
   the identification of the at least one value comprises conducting a linear maximum likelihood search for the at least one value in the at least one spatial stream.

2. The method of claim 1, further comprising decoding the received signal after the cancelation of the interference to extract data from another spatial stream directed to the apparatus.

3. A method of signal processing for an apparatus, comprising:
   receiving a signal;
   processing the received signal to determine modulation and coding of at least one spatial stream directed to at least one other apparatus; and
   using the determined modulation and coding to cancel interference from the received signal, wherein the interference is due to the at least one spatial stream, wherein:
   the at least one spatial stream comprises packets that comprise at least one value that specifies a modulation and coding scheme of the at least one spatial stream;
   the processing of the received signal comprises identifying the at least one value in the at least one spatial stream;
   the at least one spatial stream comprises a plurality of spatial streams; and
   the identification of the at least one value comprises: identifying a set of strongest spatial streams from the plurality of spatial streams, and conducting a maximum likelihood search for the at least one value in the set of strongest spatial streams.

4. A method of signal processing for an apparatus, comprising:
   receiving a signal;
   processing the received signal to determine modulation and coding of at least one spatial stream directed to at least one other apparatus; and
   using the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a linear estimation on the set of strongest spatial streams to determine the at least one value.

5. The method of claim 1, wherein the use of the determined modulation and coding to cancel the interference comprises performing a successive interference cancelation operation.

6. A method of signal processing for an apparatus, comprising:

receiving a signal;

processing the received signal to determine modulation and coding of at least one spatial stream directed to at least one other apparatus; and using the determined modulation and coding to cancel interference from the received signal, wherein the interference is due to the at least one spatial stream, wherein the processing of the received signal comprises:

identifying at least one value in the at least one spatial stream that specifies a modulation and coding scheme of the at least one spatial stream;

processing the identified at least one value to determine whether the identified at least one value is valid; and extracting modulation and coding scheme information from each value determined to be valid, and wherein the processing of the identified at least one value comprises performing a cyclic redundancy check (CRC) operation on the identified at least one value.

7. An apparatus for wireless communication, comprising:

a receiver configured to receive a signal; and a processing system configured to process the received signal to determine modulation and coding of at least one spatial stream directed to at least one other apparatus, and further configured to use the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream; and the identification of the at least one value comprises conducting a linear maximum likelihood search for the at least one value in the at least one spatial stream.

8. The apparatus of claim 7, wherein the processing system is further configured to decode the received signal after the cancelation of the interference to extract data from another spatial stream directed to the apparatus.

9. An apparatus for wireless communication, comprising:

a receiver configured to receive a signal; and a processing system configured to process the received signal to determine modulation and coding of at least one spatial stream directed to at least one other apparatus, and further configured to use the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a maximum likelihood search for the at least one value in the set of strongest spatial streams.

10. An apparatus for wireless communication, comprising:

a receiver configured to receive a signal; and a processing system configured to process the received signal to determine modulation and coding of at least one spatial stream directed to at least one other apparatus, and further configured to use the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a linear estimation on the set of strongest spatial streams to determine the at least one value.

11. The apparatus of claim 7, wherein the use of the determined modulation and coding to cancel the interference comprises performing a successive interference cancelation operation.

12. An apparatus for wireless communication, comprising:

a receiver configured to receive a signal; and a processing system configured to process the received signal to determine modulation and coding of at least one spatial stream directed to at least one other apparatus, and further configured to use the determined modulation and coding to cancel interference from the received signal, wherein the interference is due to the at least one spatial stream, wherein the processing of the received signal comprises:

identifying at least one value in the at least one spatial stream that specifies a modulation and coding scheme of the at least one spatial stream;

processing the identified at least one value to determine whether the identified at least one value is valid; and extracting modulation and coding scheme information from each value determined to be valid, and wherein the processing of the identified at least one value comprises performing a cyclic redundancy check (CRC) operation on the identified at least one value.

13. An apparatus for wireless communication, comprising:

means for receiving a signal;

means for processing the received signal to determine modulation and coding of at least one spatial stream directed to at least one other apparatus; and means for using the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream; and the identification of the at least one value comprises conducting a linear maximum likelihood search for the at least one value in the at least one spatial stream.

14. The apparatus of claim 13, further comprising means for decoding the received signal after the cancelation of the interference to extract data from another spatial stream directed to the apparatus.

15. The apparatus of claim 13, wherein the use of the determined modulation and coding to cancel the interference comprises performing a successive interference cancelation operation.

16. An apparatus for wireless communication, comprising:
means for receiving a signal;
means for processing the received signal to determine modulation and coding of at least one spatial stream directed to at least one other apparatus; and
means for using the determined modulation and coding to cancel interference from the received signal, wherein the interference is due to the at least one spatial stream, wherein:
the at least one spatial stream comprises packets that comprise at least one value that specifies a modulation and coding scheme of the at least one spatial stream;
the processing of the received signal comprises identifying the at least one value in the at least one spatial stream;
the at least one spatial stream comprises a plurality of spatial streams; and
the identification of the at least one value comprises: identifying a set of strongest spatial streams from the plurality of spatial streams, and conducting a maximum likelihood search for the at least one value in the set of strongest spatial streams.

17. An apparatus for wireless communication, comprising:
means for receiving a signal;
means for processing the received signal to determine modulation and coding of at least one spatial stream directed to at least one other apparatus; and
means for using the determined modulation and coding to cancel interference from the received signal, wherein the interference is due to the at least one spatial stream, wherein:
the at least one spatial stream comprises packets that comprise at least one value that specifies a modulation and coding scheme of the at least one spatial stream;
the processing of the received signal comprises identifying the at least one value in the at least one spatial stream;
the at least one spatial stream comprises a plurality of spatial streams; and
the identification of the at least one value comprises: identifying a set of strongest spatial streams from the plurality of spatial streams, and conducting a linear estimation on the set of strongest spatial streams to determine the at least one value.

18. An apparatus for wireless communication, comprising:
means for receiving a signal;
means for processing the received signal to determine modulation and coding of at least one spatial stream directed to at least one other apparatus; and
means for using the determined modulation and coding to cancel interference from the received signal, wherein the interference is due to the at least one spatial stream, wherein the processing of the received signal comprises:
identifying at least one value in the at least one spatial stream that specifies a modulation and coding scheme of the at least one spatial stream;
processing the identified at least one value to determine whether the identified at least one value is valid; and
extracting modulation and coding scheme information from each value determined to be valid, and
wherein the processing of the identified at least one value comprises performing a cyclic redundancy check (CRC) operation on the identified at least one value.

19. A computer-program product for wireless communication, comprising:
computer-readable storage device comprising codes executable to:
receive a signal at an apparatus;
process the received signal to determine modulation and coding of at least one spatial stream directed to at least one other apparatus; and
use the determined modulation and coding to cancel interference from the received signal, wherein the interference is due to the at least one spatial stream, wherein:
the at least one spatial stream comprises packets that comprise at least one value that specifies a modulation and coding scheme of the at least one spatial stream;
the processing of the received signal comprises identifying the at least one value in the at least one spatial stream; and
the identification of the at least one value comprises conducting a linear maximum likelihood search for the at least one value in the at least one spatial stream.

20. A wireless node, comprising:
a receiver configured to receive a signal;
a processing system configured to process the received signal to determine modulation and coding of at least one spatial stream directed to at least one other wireless node, and further configured to use the determined modulation and coding to cancel interference from the received signal, wherein the interference is due to the at least one spatial stream; and
a user interface configured to output an indication based on the received signal after cancellation of the interference, wherein:
the at least one spatial stream comprises packets that comprise at least one value that specifies a modulation and coding scheme of the at least one spatial stream;
the processing of the received signal comprises identifying the at least one value in the at least one spatial stream; and
the identification of the at least one value comprises conducting a linear maximum likelihood search for the at least one value in the at least one spatial stream.

21. A computer-program product for wireless communication, comprising:
computer-readable storage device comprising codes executable to:
receive a signal at an apparatus;
process the received signal to determine modulation and coding of at least one spatial stream directed to at least one other apparatus; and
use the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a maximum likelihood search for the at least one value in the set of strongest spatial streams.

22. A computer-program product for wireless communication, comprising:

computer-readable storage device comprising codes executable to:

receive a signal at an apparatus;

process the received signal to determine modulation and coding of at least one spatial stream directed to at least one other apparatus; and use the determined modulation and coding to cancel interference from the received signal, wherein the interference is due to the at least one spatial stream, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a linear estimation on the set of strongest spatial streams to determine the at least one value.

23. A computer-program product for wireless communication, comprising:

computer-readable storage device comprising codes executable to:

receive a signal at an apparatus;

process the received signal to determine modulation and coding of at least one spatial stream directed to at least one other apparatus; and use the determined modulation and coding to cancel interference from the received signal, wherein the interference is due to the at least one spatial stream, wherein the processing of the received signal comprises:

identifying at least one value in the at least one spatial stream that specifies a modulation and coding scheme of the at least one spatial stream;

processing the identified at least one value to determine whether the identified at least one value is valid; and extracting modulation and coding scheme information from each value determined to be valid, and wherein the processing of the identified at least one value comprises performing a cyclic redundancy check (CRC) operation on the identified at least one value.

24. A wireless node, comprising:

a receiver configured to receive a signal;

a processing system configured to process the received signal to determine modulation and coding of at least one spatial stream directed to at least one other wireless node, and further configured to use the determined modulation and coding to cancel interference from the received signal, wherein the interference is due to the at least one spatial stream; and a user interface configured to output an indication based on the received signal after cancellation of the interference, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a maximum likelihood search for the at least one value in the set of strongest spatial streams.

25. A wireless node, comprising:

a receiver configured to receive a signal;

a processing system configured to process the received signal to determine modulation and coding of at least one spatial stream directed to at least one other wireless node, and further configured to use the determined modulation and coding to cancel interference from the received signal, wherein the interference is due to the at least one spatial stream; and a user interface configured to output an indication based on the received signal after cancellation of the interference, wherein:

the at least one spatial stream comprises packets that comprise at least one value that specifies a modulation and coding scheme of the at least one spatial stream;

the processing of the received signal comprises identifying the at least one value in the at least one spatial stream;

the at least one spatial stream comprises a plurality of spatial streams; and the identification of the at least one value comprises: identifying a set of strongest spatial streams from the plurality of spatial streams, and conducting a linear estimation on the set of strongest spatial streams to determine the at least one value.

26. A wireless node, comprising:

a receiver configured to receive a signal;

a processing system configured to process the received signal to determine modulation and coding of at least one spatial stream directed to at least one other wireless node, and further configured to use the determined modulation and coding to cancel interference from the received signal, wherein the interference is due to the at least one spatial stream; and a user interface configured to output an indication based on the received signal after cancellation of the interference, wherein the processing of the received signal comprises:

identifying at least one value in the at least one spatial stream that specifies a modulation and coding scheme of the at least one spatial stream;

processing the identified at least one value to determine whether the identified at least one value is valid; and extracting modulation and coding scheme information from each value determined to be valid, and wherein the processing of the identified at least one value comprises performing a cyclic redundancy check (CRC) operation on the identified at least one value.

* * * * *